Oct. 13, 1959     A. B. CAPRON ET AL     2,908,384
METHOD OF APPLYING A PARTICULATE LUBRICANT
TO A TUBULAR EXTRUSION BILLET
Filed March 3, 1954     2 Sheets-Sheet 1
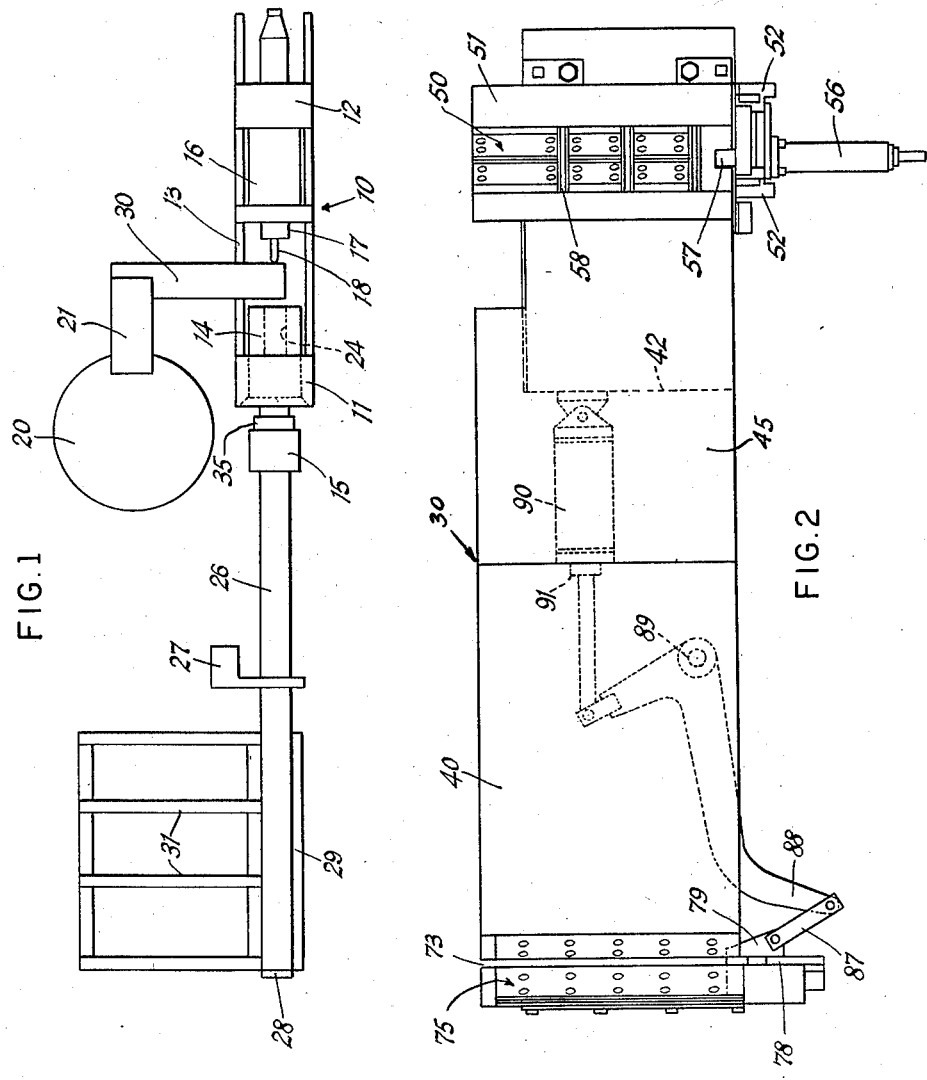
INVENTORS
*Adin B. Capron*
*David A. Edgecombe*
BY *Sidley O. Evans*
ATTORNEY Oct. 13, 1959     A. B. CAPRON ET AL     2,908,384
METHOD OF APPLYING A PARTICULATE LUBRICANT
TO A TUBULAR EXTRUSION BILLET
Filed March 3, 1954     2 Sheets-Sheet 2
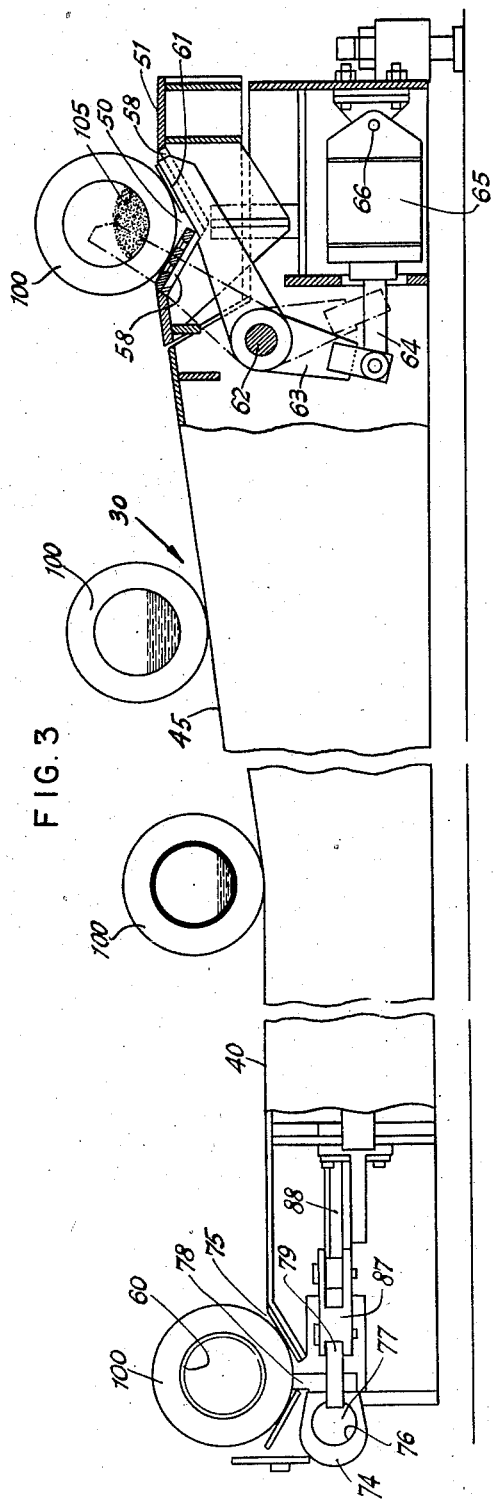
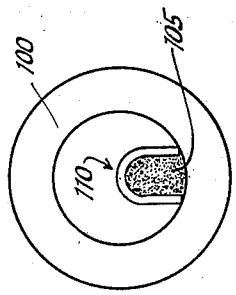
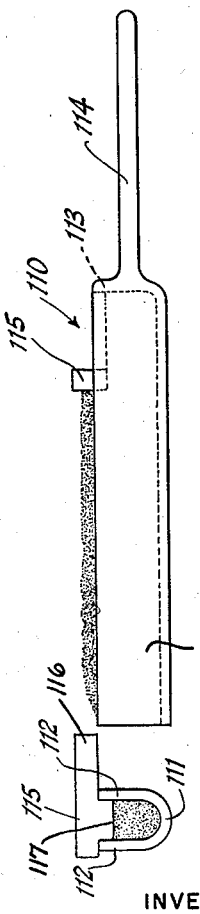
INVENTORS
Adin B. Capron
David A. Edgecombe
BY Sidley O. Evans
ATTORNEY 2,908,384
METHOD OF APPLYING A PARTICULATE LUBRI-CANT TO A TUBULAR EXTRUSION BILLET

Adin B. Capron, Beaver, and David A. Edgecombe and Sidley O. Evans, Beaver Falls, Pa., assignors to The Babcock & Wilcox Company, New York, N.Y., a corporation of New Jersey Application March 3, 1954, Serial No. 413,766

1 Claim. (Cl. 207—10)

This invention relates to a novel method of applying a pulverized refractory lubricant to the inner surface of a pierced extrusion billet and to novel apparatus useful in practicing such method.

In the formation of metal shapes by extrusion, a block or billet of metal at an elevated temperature is forced under high pressure to flow through a die having an opening corresponding to the desired cross-sectional shape of the extrusion to be produced. The temperature of the metal may be 2300° F., in the case of steel, by way of example.

To form a tubular extrusion, the billet is usually pierced before insertion in the extrusion press and, before ram pressure is applied to the billet, a mandrel is projected coaxially through the billet and die. When pressure is applied to the billet, the billet metal flows through the die around the mandrel, so that a tube is extruded having dimensions determined by the die and the mandrel. In effect, the die and mandrel cooperate to form an annular extrusion orifice.

In a typical extrusion press, front and rear platens are held in accurately spaced relation with each other. Between the platens is mounted a billet container for movement toward and away from the forward platen. The rear platen supports a ram arranged to project into the container and force a billet therein to flow through the die. The latter is mounted in a die holder releasably engaged in a die carrier aligned with the container passage. This carrier is mounted for movement into and out of the forward platen to move the die into and out of operative relation with the exit or downstream end of the container.

When an extrusion is to be made, the container is moved forwardly to seat against the rear face of the forward platen. A die holder and die assembly is meanwhile mounted on the rear face of the carrier and the latter is moved rearwardly into the forward platen to engage the die in a recess in the forward end of the container and coaxial with the container passage. The carrier is then locked to the forward platen. After a heated billet has been loaded into the container, the ram, carrying a dummy block on its outer end, is moved forwardly under very high pressure to force the billet outwardly through the die. The extrusion is then severed and conveyed away from the press.

The formation of metal shapes by extrusion has been successfully applied to non-ferrous metals for some time. However, it is only recently that plain and alloy steels have been extruded using glass as a lubricant. This has been due to the relative difficulties and problems involved in the extrusion of steels and alloys as compared to the difficulties and problems of extruding non-ferrous metals such as aluminum, brass, and copper. For example, the use of lubricants having a carbon base for the extrusion of some alloy steels may require an excessive amount of refinishing of the extruded shape due to the carbon pickup in the hot metal. These extra finishing operations have prevented the extrusion process from attaining a competitive position with respect to other metal working processes.

This picture has been changed radically by the introduction of a new steel extrusion process in which relatively refractory materials, such as glass, have been used as lubricants. These refractory materials have the advantage that they do not contain any significant amounts of carbon as a constituent element, coupled with a further advantage that the glass has the property of melting in successive layers or films as it is contacted by the hot metal. Thus, only the surface or contacting layer of the glass is initially melted as the billet moves therealong, and as this film is destroyed, successive underlying layers or films are melted sequentially, thus providing a continuous lubricant film between the extrusion and the die through which the extrusion is being forced under very high pressures.

In the aforementioned typical extrusion press, plugs of glass fibre or similar material are placed in the container passage before the billet is loaded into the container. Charging of the billet into the container pushes these plugs up against the upstream or entry surface of the die. In addition, a layer of glass lubricant is applied to the external surface of the hot billet as the latter is being fed to the extrusion press. This may be effected by wrapping a sheet of glass fiber around the billet surface as the heated billet rolls over a transfer surface toward the press, or by rolling the hot billet over a bed of powdered glass.

The surface of the internal passage in the pierced billet is lubricated presently by placing a "sock" of glass fiber on the outer end of the mandrel before the latter is projected through the billet and die. The glass of this "sock" progressively melts as the billet is extruded outwardly over the mandrel through the die.

The overall thickness of the woven glass fiber sock or sleeve is substantially in excess of the average thickness of the glass film formed on the surface of the billet passage and of the die as a result of melting of the glass fiber sleeve or sock.

To provide the necessary clearance for projection of the sleeve covered mandrel through the billet and die without binding, the passage diameter must be greater than the mandrel diameter by at least the overall thickness of the glass sleeve or sock. As such thickness is greater than the average thickness of the glass film resulting from melting of the sock, the passage diameter is correspondingly greater than it need be if such glass film were distributed uniformly over the surfaces of the billet and die passages.

Reduction of the passage diameter to a value closely approaching that of the mandrel diameter has a vital effect on the quality of tubular extrusions, particularly on the concentricity of the inside and outside diameters of the extrusions. The smaller the clearance between the mandrel and the inside passage of the billet, the better the concentricity of the extruded tubular elements. This improvement in concentricity probably results from some action which occurs during the collapse of the billet when extrusion pressure is initially applied. No matter what its cause, the improvement in concentricity due to reduction of such clearance is very significant and has been adequately demonstrated in extrusion operations.

To this end, the present invention is directed to a novel method of and apparatus for applying a layer of refractory lubricant, of uniform thickness, on the interior surface of a tubular billet before the latter is loaded into the extrusion press container. The uniform depth of this film is carefully controlled so that it provides substantially exactly the right amount of lubricant for each extrusion, the depth being determined from such factors as the temperature and composition of the billet, and its length and internal diameter.

A preferred way of providing this uniformly thick lubricating layer is to roll the billet over a transfer surface or means on its way from the heating bath or furnace to the extrusion press. A measured quantity of solid glass, in the form of pulverized or powdered glass, is deposited along the billet passage as the billet starts to roll over the transfer surface on its way to the press. The glass in contact with the hot surface of the billet passage becomes plastic and sticks to such surface. As the billet rolls over the transfer surface, the unadhered glass powder is tumbled and, as it contacts the surface, becomes plasticized and adheres thereto. The continued tumbling of the pile of powder with such successive adherence of the particles to the hot surface results in the glass being uniformly distributed over the surface of the passage in the billet, forming a film of uniform depth on this surface.

With the glass lubricant already applied to the internal surface of the billet before the latter is charged into the press, the mandrel does not have to be fitted with a sleeve or sock of glass fiber. Consequently, the size of the hole formed in the billet can be reduced by substantially the difference between the overall thickness of the glass sleeve and the thickness of the glass film on the billet internal surface. This reduction results in closer clearance between billet and mandrel with resulting improvement in concentricity. The operation is also speeded as no delay is required for fitting of the sleeve onto the mandrel. A further saving results from the ability to use glass in the very inexpensive form of powdered glass, as compared to the use of relatively expensive sleeves woven from glass fiber.

The powdered glass is deposited along the billet passage by means of an elongated, U-shape trough or spoon designed to hold just the right quantity of powdered glass. This spoon has glass placed therein and leveled off to a predetermined height as by running a key shaped scraper along the upper edges of the trough or spoon side walls. The length of the spoon used with each length of billet is determined by the length of the billet. To deposit the glass in the billet passage, the loaded spoon is extended therethrough and then inverted.

For an understanding of the invention principles, reference is made to the following description of a typical embodiment thereof as illustrated in the accompanying drawings.

In the drawings:

Fig. 1 is a schematic plan view of an extrusion press and associated billet and extrusion handling and processing components;

Fig. 2 is a plan view of transfer means for conveying a billet from a billet heating means to the extrusion press;

Fig. 3 is a side elevation view of the transfer means illustrating a billet in successive positions therealong;

Fig. 4 is a side elevation view of the spoon;

Fig. 5 is an end elevation view of the spoon; and

Fig. 6 is an end elevation view of the billet showing the spoon therein.

Referring to Fig. 1, an extrusion press 10 is illustrated as including a front platen 11, a rear platen 12 rigidly tied to platen 11 by tie rods such as 13, a container 14 having limited longitudinal movement relative to the platens, a die carrier 15 movable into and out of front platen 11, and a ram assembly 16 having a ram 17 projectable into container 14. A mandrel 18 is mounted coaxially of ram 17.

As described in the copending application of Sidley O. Evans, Serial No. 328,688, filed Dec. 30, 1952, now Patent No. 2,739,799 billets intended for the extrusion of tubular products are preferably initially heated to a piercing temperature and then pierced with an I.D. somewhat larger than that of the extruded tubular products. The initial heating means, the piercing press, and associated conveyors, and handling devices have not been shown in detail as they form no part of the present invention.

The pierced billets are then heated to a high temperature, such as 2300° F. in the case of steel, in a preferably rotary heating means 20. The billets are charged into heating means 20 and extracted therefrom by suitable billet handling device 21. This device deposits the heated billets onto a transfer means 30 which transfers the billets into alignment with passage 24 of container 14 and ejects them into this passage.

Mandrel 18 is first extended through the billet passage and through a die 35 mounted on the rear face of carrier 15 and held thereby against the exit end of container passage 24, carrier 15 being locked into forward platen 11 and thus held against movement relative to the two platens 11 and 12. Ram 17 is then projected into passage 24 to engage the billet and force it, under high pressure, to flow through die 35 around mandrel 18, thus forming a tubular extrusion. Mandrel 18 is withdrawn into ram 17 at the end of the extrusion stroke, and ram 17 and mandrel 18 are then conjointly withdrawn and container 14 moved rearwardly a short distance away from front platen 11. The extrusion is then severed between the container and front platen, after which container 14 is moved forwardly and the extrusion withdrawn by runout table and conveyor 26. Ram 17 is then moved into container 14 to eject the severed end, or discard, of the extrusion, this discard moving into platen 11 and falling into a suitable receptacle.

Meanwhile, conveyor 26 moves the extrusion forwardly beneath a saw 27. The latter severs the extrusion into the required handling lengths and the cut sections are moved forwardly against a stop 28. At this point, a pusher 29 moves the sections laterally from conveyor 26 onto skids 31 for storage or further handling.

Before the billet, such as 100, is charged into the passage 24 of container 14, one or more cylindrical plugs of glass fiber are placed in the passage 24 so that loading of the billet thereinto will result in the plugs being interposed between the billet and the upstream face of the die assembly. The die assembly is shown and described more particularly in the copending application of David A. Edgecombe, Serial No. 334,211, filed January 30, 1953, for "Die Charging Arrangement for Metal Working Apparatus," now Patent No. 2,731,123. Also, and as has been briefly mentioned heretofore, the billet has a layer of glass lubricant applied to its external surface as it moves along transfer means 30 to the extrusion press. This may be effected, for example, by wrapping a mat of glass fiber around the billet as it moves along means 30, as described in the copending application of David A. Edgecombe, Serial No. 346,010, filed March 31, 1953, now Patent No. 2,738,062. The external layer of glass lubricant may, of course, be applied to the billet in any other desired manner.

As set forth above, lubricant presently is applied to mandrel 18 and the passage in billet 100 by placing a sleeve or sock of glass fiber on mandrel 18 before it is projected into the billet passage. This necessitates the billet passage diameter, or the billet I.D., being greater than that of the mandrel by the overall thickness of the glass fiber sleeve or sock. In turn, this overall thickness is substantially greater than the average thickness of the glass film resulting from plasticization or melting of the sleeve or sock. The present invention is directed to a novel method for applying the glass film to the internal surface of the billet before the latter is charged into the extrusion press. Thereby, the billet passage diameter may be reduced so that the internal diameter of the lubricant layer on its surface is substantially that of the mandrel.

Referring to Figs. 2 and 3, the transfer means 30 is provided, adjacent its end remote from the extrusion press, with a sloping surface or ramp 45 leading into a substantially level platform 40. Billet 100 is delivered from heating means 20, by a billet handling device 21 which may be of the type shown and described in the copending application of Sidley O. Evans, Serial No. 328,688, filed December 3, 1952, for "Charge-Discharge Mechanism for Billet Heating Means," now Patent No. 2,739,799, issued March 27, 1956. As before described more particularly in such Evans application, device 21 is a drum shaped elevator carrying on its periphery a trough arranged to receive a metal "basket" in which is a highly heated billet.

In the unloading position of means 21, this trough is aligned with a trough 50 formed in the upper surface of a table 51 pivotal on trunnions 52 on a shaft extending longitudinally of means 30. Trough 50 may thus be swung up into alignment with the trough on means 21 to receive a billet, and then lowered to hold the billet axis parallel with transfer means 30.

Extending from the hinged end of platform 51 is a shock absorber means 56 having a plunger 57 extending into trough 50 in substantial central alignment therewith. As the billet is ejected into trough 50, the plunger 57 acts as a cushioning means for the billet.

By reference to Fig. 2, it will be noted that trough 50 is formed with transverse slots 58. As the trough reaches its horizontal position, fingers 61, secured to a transverse shaft 62, enter slots 58 to lie slightly beneath the billet supporting surface of the trough 50. A crank arm 63, secured to shaft 62, is connected to a piston rod 64 of a pressure fluid actuator 65 pivotally connected at 66 to the framework of means 30. With the trough in the horizontal position, actuator 65 can be operated to cause fingers 61 to be swung counter-clockwise moving billet 100 out of the trough to roll down the ramp 45.

In accordance with the invention, solid glass, in the form of powdered glass, is deposited along the axial passage of the heated billet while the latter is in trough 50. The amount of solid glass so applied is selected in accordance with the billet temperature, composition, length, and I.D. to provide a lubricant film, on the surface of the axial passage, having the required depth for effective lubrication of mandrel 18 and the billet passage.

The powdered glass is applied by means of an elongated U-shaped trough or spoon 110, shown in Figs. 4, 5 and 6, having a base 111, side walls 112, a rear wall 113 and a handle 114. The length of the spoon without the handle is substantially equal to or greater than the length of billet 100, and the same trough is used for all sizes of billets.

Spoon 110 is inserted into a container of powdered glass and filled. A scraper 115 is then drawn along the upper edges of walls 112 to remove the excess glass, after which spoon 110 is extended through the billet passage and then inverted to dump an elongated pile of powdered glass 105 along the passage. The scraper 115 is a key shape element having a handle 116 with a plate-like extension 117 whose width is substantially equal to the spacing between walls 112. The extent of element 117 from handle 116 is selected in accordance with the billet size so that the amount of glass remaining in trough 110 after the excess is removed is the correct quantity for the particular size of billet, it being borne in mind that, when the trough 110 is extended through the billet and "dumped," only the glass along the trough portion in the billet will be deposited in the latter. The glass in trough 110 beyond either end of the billet falls outside the billet and is later reclaimed. A different scraper 115 is used for each billet size, the difference being in the height of extension 117.

Actuator 65 is then energized to cause fingers 61 to swing counter-clockwise to eject the billet from trough 50 to roll down surface 45 and over surface 40. The solid glass in direct contact with the hot metal is melted by contact therewith and sticks to the surface of the passage. As the billet rolls over transfer means 30, the pile of glass is tumbled so that additional glass is brought into direct contact with other portions of the hot metal of the billet passage to melt and stick thereto. In this manner, the powdered glass is uniformly distributed over the surface of the billet passage to form a uniform depth glass layer, this layer being indicated at 60.

As the billet rolls over transfer means 30, it has a layer of glass adhered to its outer surface in any desired manner. At the end of surface 40 nearest the extrusion press, the billet rolls into the container charge device or billet ejector 75. Referring to Figs. 2 and 3, this ejector comprises a V-shaped trough having a slot 73 along its apex. The outer wall of trough 75 carries a guide 74 having a key-shaped slot 76 receiving a correspondingly shaped rib 77 formed on an ejector bar 78. Ejector bar 78 is thus guided to move along slot 73.

In its opposite surface, bar 78 has projecting therefrom an ear 79 connected by a link 87 to one end of a crank 88 pivoted on an axis 89 to swing parallel to surface 40. The other end of crank 88 is connected to the piston 91 of a pressure fluid actuator 90 pivoted to a cross brace 42 of the transfer means framework. Actuator 90 is operated, when trough 75 is aligned with container passage 24, to swing crank 88 to move bar 78 along slot 73 in trough 75 to charge the billet into the container passage.

While trough 75 is shown fixed to surface 40 for illustrative purposes, in actual practice it may be mounted on the free end of a pivoted section of transfer means 30 so as to be swingably out of the path of movement of the extrusion press parts. The details of any such construction form no part of the present invention. Also, the trough 50 may be made movable longitudinally relative to transfer means 30 between the illustrated position and a receiving and tilted position adjacent means 21.

While a specific embodiment of the invention has been shown and described in detail to illustrate the application of the invention principles, it will be understood that the invention may be embodied otherwise without departing from such principles.

What is claimed is:

A method of extruding hollow metal billets comprising heating the billet to an extrusion temperature, placing in a spoon over a length thereof at least equal to the length of the billet a measured quantity of particulate glass having a relatively wide range of melting temperatures below but approaching the temperature to which the billet is heated, inserting said spoon through the passage of the heated billet and depositing the particulate glass therefrom throughout the length of the passage, rolling the heated billet along a path to the extrusion press, whereby rotation of the billet melts and distributes the glass throughout the surface of the passage to coat substantially the entire peripheral surface of the passage in the hot billet with an adhering viscous layer of glass, charging the coated billet into the container, inserting the mandrel into the billet passage, and while the coating remains in a viscous condition extruding the billet.

References Cited in the file of this patent

UNITED STATES PATENTS

| Number | Name | Date |
| --- | --- | --- |
| 567,410 | Potter | Sept. 8, 1896 |
| 862,285 | Schmidt | Aug. 6, 1907 |
| 914,459 | Schwaninger | Mar. 9, 1909 |
| 1,124,281 | Bradley | Jan. 12, 1915 |
| 1,458,039 | Eiermann | June 5, 1923 |
| 1,676,815 | Beatty | July 10, 1928 |
| 1,997,761 | Bailey et al. | Apr. 16, 1935 |
| 2,047,237 | Updegraff | July 14, 1936 |
| 2,299,418 | Thomas | Oct. 20, 1942 |
| 2,430,083 | Sherman | Nov. 4, 1947 |
| 2,538,917 | Sejournet et al. | Jan. 23, 1951 |
| 2,630,220 | Sejournet | Mar. 3, 1953 |
| 2,706,850 | Sejournet et al. | Apr. 26, 1955 |
| 2,810,478 | Sejournet et al. | Oct. 22, 1957 |

FOREIGN PATENTS

| Number | Country | Date |
| --- | --- | --- |
| 11,439 | Great Britain | 1912 |